(12) United States Patent
Swoboda (10) Patent No.: US 7,392,431 B2
(45) Date of Patent: Jun. 24, 2008

(54) EMULATION SYSTEM WITH PERIPHERALS RECORDING EMULATION FRAME WHEN STOP GENERATED

(75) Inventor: Gary L. Swoboda, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 720 days.

(21) Appl. No.: 11/064,242

(22) Filed: Feb. 22, 2005

(65) Prior Publication Data

US 2005/0166092 A1    Jul. 28, 2005

Related U.S. Application Data (63) Continuation-in-part of application No. 09/481,853, filed on Jan. 14, 2000, now abandoned.

(60) Provisional application No. 60/120,810, filed on Feb. 19, 1999.

(51) Int. Cl.
*G06F 11/00*   (2006.01)
*G06F 11/36*   (2006.01)

(52) U.S. Cl. ................ 714/28; 714/33; 714/38; 717/127; 717/128

(58) Field of Classification Search .......... 714/28, 714/33, 34, 35, 38; 717/127, 128
See application file for complete search history.

(56) References Cited

U.S. PATENT DOCUMENTS

| | | | |
|---|---|---|---|
| 4,031,517 A * | 6/1977 | Hirtle | 703/24 |
| 5,708,814 A * | 1/1998 | Short et al. | 710/260 |
| 5,896,538 A * | 4/1999 | Blandy et al. | 717/127 |
| 6,002,872 A * | 12/1999 | Alexander et al. | 717/127 |
| 6,249,881 B1 * | 6/2001 | Porten et al. | 714/38 |
| 6,308,316 B1 * | 10/2001 | Hashimoto et al. | 717/127 |
| 6,311,325 B1 * | 10/2001 | Levine et al. | 717/128 |
| 6,324,684 B1 * | 11/2001 | Matt et al. | 717/124 |

* cited by examiner

*Primary Examiner*—Scott T Baderman
*Assistant Examiner*—Joseph Schell
(74) *Attorney, Agent, or Firm*—Robert D. Marshall, Jr.; W. James Brady; Frederick J. Telecky, Jr.

(57) ABSTRACT

In-circuit-emulation of an integrated circuit includes a digital data processor capable of executing program instructions. A first debug event is detected during normal program execution. The causes the in-circuit-emulation to suspend program execution except for real time interrupts. A debug frame counter increments on each interrupt and decrements on each return from interrupt. If a debug event is detected during an interrupt service routine, that interrupt service routine is suspended and the count of the debug frame counter is stored. Execution of other interrupt service routines in response to corresponding interrupts is still permitted. The integrated circuit includes plural debug event detectors and the debug frame count is stored at the detector detecting a debug event during an interrupt service routine. This permits a determination of the order of interrupts triggering debug events by reading the stored debug frame count from each debug event detector.

7 Claims, 3 Drawing Sheets

EMULATION SYSTEM WITH PERIPHERALS RECORDING EMULATION FRAME WHEN STOP GENERATED

CLAIM OF PRIORITY

This application is a continuation-in-part of U.S. patent application Ser. No. 09/481,853 filed Jan. 14, 2000 now abandoned, which claims priority under 35 USC §119(e)(1) of Provisional Application No. 60/120,810, filed Feb. 19, 1999.

CITATION OF RELATED APPLICATIONS

This application is related to co-assigned applications:

Ser. No. 09/154,385 entitled "METHOD OF INITIALIZING A CPU CORE FOR EMULATION" filed Sep. 16, 1998, now U.S. Pat. No. 6,167,385 issued Dec. 26, 2000; and The following contemporaneously filed applications:

Ser. No. 09/483,367, entitled "EMULATION SUSPEND MODE WITH DIFFERING RESPONSE TO DIFFERING CLASSES OF INTERRUPTS" claiming priority from U.S. Provisional Application No. 60/120,809 filed Feb. 19, 1999, now U.S. Pat. No. 6,553,513;

Ser. No. 09/481,852, entitled "EMULATION SUSPENSION MODE WITH STOP MODE EXTENSION" claiming priority from U.S. Provisional Application No. 60/120,809 filed Feb. 19, 1999, now U.S. Pat. No. 6,567,933;

Ser. No. 09/483,568, entitled "EMULATION SUSPEND MODE HANDLING MULTIPLE STOPS AND STARTS" claiming priority from U.S. Provisional Application No. 60/120,809 filed Feb. 19, 1999, now U.S. Pat. No. 6,564,339;

Ser. No. 09/483,697, entitled "EMULATION SUSPEND MODE WITH FRAME CONTROLLED RESOURCE ACCESS" claiming priority from U.S. Provisional Application No. 60/120,809 filed Feb. 19, 1999, now U.S. Pat. No. 6,557,116;

Ser. No. 09/482,902, entitled "EMULATION SUSPEND MODE WITH INSTRUCTION JAMMING" claiming priority from U.S. Provisional Application No. 60/120,809 filed Feb. 19, 1999, now U.S. Pat. No. 6,643,803;

Ser. No. 09/483,570, entitled "SOFTWARE EMULATION MONITOR EMPLOYED WITH HARDWARE SUSPEND MODE" claiming priority from U.S. Provisional Application No. 60/120,683 filed Feb. 19, 1999, now U.S. Pat. No. 6,820,051;

Ser. No. 09/483,237, entitled "EMULATION SYSTEM WITH SEARCH AND IDENTIFICATION OF OPTIONAL EMULATION PERIPHERALS" claiming priority from U.S. Provisional Application No. 60/120,960 filed Feb. 19, 1999, now U.S. Pat. No. 6,671,665;

Ser. No. 09/483,783, entitled "EMULATION SYSTEM WITH ADDRESS COMPARISON UNIT AND DATA COMPARISON UNIT OWNERSHIP ARBITRATION" claiming priority from U.S. Provisional Application No. 60/120,791 filed Feb. 19, 1999, now U.S. Pat. No. 6,606,590; and Ser. No. 09/483,321 entitled "EMULATION SYSTEM EMPLOYING SERIAL TEST PORT AND ALTERNATIVE DATA TRANSFER PROTOCOL" claiming priority from U.S. Provisional Application No. 60/120,667 filed Feb. 19, 1999, now U.S. Pat. No. 6,836,757.

TECHNICAL FIELD OF THE INVENTION

The technical field of this invention is complex integrated circuits including embedded digital processor cores and more particularly in circuit emulation of integrated circuits with embedded digital processor cores.

BACKGROUND OF THE INVENTION

Programmable digital processors such as microprocessors and digital signal processors have become very complex machines. Testing these programmable digital processors has also become complex task. It is now common for semiconductor manufactures to build single integrated circuit programmable digital processors with millions of transistors. The current trend is to devote many of these transistors to on-chip cache memories. Even so, the number of logic circuits and their complex relationships makes testing such integrated circuits an increasingly difficult task.

A trend in electronics makes this testing problem more difficult. Single integrated circuit programmable digital processors are becoming more and more of the electronics of many end products. A single integrated circuit used in this way typically includes a programmable digital processor, read only memory storing the base program, read/write memory for operation and a set of peripherals selected for the particular product. This trend is known as system level integration. In the ultimate system level integration, all the electronics are embodied in a single integrated circuit. This level of integration is now achieved in electronic calculators. Many electronic calculators consist of a single integrated circuit, a keyboard, a display, the battery or solar panel power source and a plastic case. Such integration provides less "visibility" into the operation of the programmable digital signal processor. Because the address and data busses of the digital processor are no longer brought out the device pins, it is more difficult to determine the behavior of the embedded processor from external connections.

Another trend in electronics makes this testing problem more difficult. Many new product applications require differing types of processing. Often control processes and user interface processes are better handled with a different programmable digital processor than digital signal processes. An example is wireless telephones. Many coding/decoding and filtering tasks are best handled by a digital signal processor (DSP). Other tasks such as dialing, controlling user inputs and outputs are best handled by microprocessors such as a RISC (Reduced Instruction Set Computer) processor. There is a trend for a system integrated circuit to include both a RISC processor and a DSP. These two processors will typically operate independently and employ differing instruction set architectures. Thus there may be more than one programmable digital processor on a single integrated circuit, each having limited visibility via the device pins.

Another problem is product emulation when employing these programmable digital processors. Product development and debugging is best handled with an emulation circuit closely corresponding to the actual integrated circuit to be employed in the final product. In circuit emulation (ICE) is in response to this need. An integrated circuit with ICE includes auxiliary circuits not needed in the operating product included solely to enhance emulation visibility. In the typical system level integration circuit, these emulation circuits use only a very small fraction of the number of transistors employed in operating circuits. Thus it is feasible to include ICE circuits in all integrated circuits manufactured. Since every integrated circuit can be used for emulation, inventory and manufacturing need not differ between a normal product and an emulation enhanced product.

As a result of these trends there is a need in the art for integrated circuits which are easier to test and easier to emulate.

SUMMARY OF THE INVENTION

This invention is in-circuit-emulation of an integrated circuit including a digital data processor capable of executing program instructions. A first debug event is detected during normal program execution. The causes the in-circuit-emulation to suspend program execution except for real time interrupts. A debug frame counter increments on each interrupt and decrements on each return from interrupt. If a debug event is detected during an interrupt service routine, that interrupt service routine is suspended and the count of the debug frame counter is stored. Execution of other interrupt service routines in response to corresponding interrupts is still permitted. The integrated circuit includes plural debug event detectors and the debug frame count is stored at the detector detecting a debug event during an interrupt service routine. This permits a determination of the order of interrupts triggering debug events by reading the stored debug frame count from each debug event detector.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
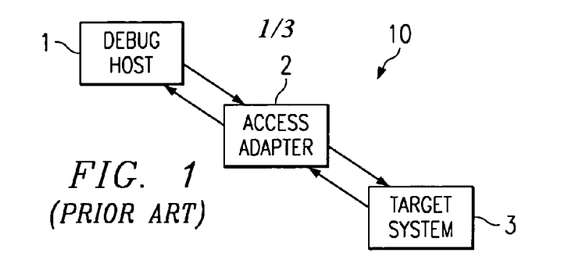
FIG. 1 illustrates the environment of the debugging system of this invention which is known in the art.

FIG. 1 illustrates the environment of the debugging system of this invention. This environment connects high level debugging software executing on a debug host computer 1 to a low level debug interface supported by the target system 3. In this invention the target system 3 may include more than one programmable digital processor and possibly more than one such programmable digital processor on a single integrated circuit. In this application the term programmable digital processor is meant to encompass devices commonly known as microprocessors, microcontrollers and digital signal processors. The target system 3 provides a standard interface to the access adapter 2.

Debug host computer 1 consists of a computer, for example a PC, running a CPU core specific software debugger as one of its tasks. The debug host computer 1 allows the user to issue high level commands such as setting breakpoint, single stepping the programmable digital processor in target system 3 and displaying the contents of a memory range.

Access adapter 2 is a combination of hardware and software that connects the debug host computer 1 to target system 3. Access adapter 2 utilizes one or more hardware interfaces and/or protocols to convert messages created by user interface commands of debug host computer 1 into debug commands operable on target system 3. Access adapter 2 can be either loosely coupled or tightly coupled to the debug host computer 1. In the case of a PC host computer, access adapter 3 can be an XDS 510 scan controller attached directly to the PC bus. This implements a tightly coupled configuration requiring the PC to perform even the lowest level actions necessary to manage debug activity. In loosely coupled configurations, debug host computer 1 CPU communicates with another processor over a high bandwidth interface such as a SCSI, LAN or other interface. An example of this is a XDS 510WS controller connected to the target system debug interface and to the PC through a SCSI port. In this case access adapter 2 is a debug subsystem manager and handles the detailed manipulation of the target debug capability, and debug host computer 1 send high level commands to the debug subsystem. Access adapter 2 returns data and error conditions to debug host computer 1. Current PC operating systems may not be able to service the low level debug requirements continuously. Thus it may be advantageous to partition the problem into the display and user interface and control sections.

The target system 3 contains one or more programmable digital processor cores. The programmable digital processor core(s) contain hardware designed explicitly to ease debugging. This special hardware of target system 3 is the lowest element of the system debug environment 10. The programmable digital processor core debug facilities allow the user to control the program execution, examine or change system memory, core CPU resources in real-time.

The interface of access adapter 2 to target system 3 is preferably an extension to the IEEE 1149.1 (JTAG) test standard. The JTAG standard includes 5 primary signals known as nTRST, TCK, TMS, TDI, and TDO. The JTAG standard typically employs three additional signals Test Clock Out (TCKO), the target supply (Vdd) and ground (GOD). The preferred embodiment of this invention also employs the two extension signals nET1 and nET0. Table 1 lists these signals, states whether the signal is an input, an output or both, and gives the descriptive name of the signal.

TABLE 1

| Pin | Type Input/Output | Description |
| --- | --- | --- |
| nTRST | I | Test Logic Reset Not |
| TCK | I | Test Clock |
| TMS | I | Test Mode Select |
| TDI | I | Test Data Input |
| TDO | O | Test Data Output |
| TCKO | O | Test Clock Out |
| PD (Vdd) | I | Target Power Supply |
| GOD | I/O | Ground |
| nET1 | I/O | Emulation and Test 1 Not |
| nET0 | I/O | Emulation and Test 0 Not |

The signal nTRST is called Test Logic Reset Not. A low applied to this pin causes all test and debug logic in the target device to be reset along with the IEEE 1149.1 interface.

The signal TCK is called Test Clock. This signal is used to drive the IEEE 1149.1 state machine and logic. The same TCK supplied to the target device is supplied to this pin.

The signal TMS is called Test Mode Select. This signal directs the next state of the IEEE 1149.1 test access port state machine.

The signal TDI is called Test Data Input. This signal is the scan data input to the target device.

The signal TDO is called Test Data Output. This signal is the scan data output of the target device.

Figure 2:
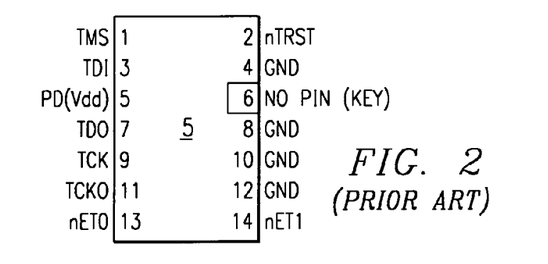
FIG. 2 illustrates the known 14-pin JTAG header used to interface the target system to the access adapter.

FIG. 2 illustrates a 14-pin JTAG header used to interface target system 3 to access adapter 2. The JTAG header requires three additional pins and further includes two extension pins. The signal TCKO is called Test Clock Out. This signal is a test clock supplied by the scan controller to the target system. This test clock can be used as the system TCK source, or it can be ignored with the TCK source being generated by the target system. In many target systems, TCKO is simply connected to TCK and used as the test clock. The PD (Vdd) is called the Target Power Supply. This is used as a power detect input to access adapter 2. The JTAG header also includes ground connections.

The preferred embodiment of this invention includes an extension to the JTAG interface. Two pins nET0 and nET1 serve as a two pin trigger channel function. This function supplements the serial access capability of the standard interface with continuous monitoring of device activity. The two added pins create debug and test capabilities that cannot be created with the standard interface. The nET0 signal is called Emulation and Test 0 Not. This signal helps create a trigger to channel zero. Similarly, the nET1 signal is called Emulation and Test 1 Not. This signal helps create a trigger to channel one. These channels will be further explained below.

Figure 3:
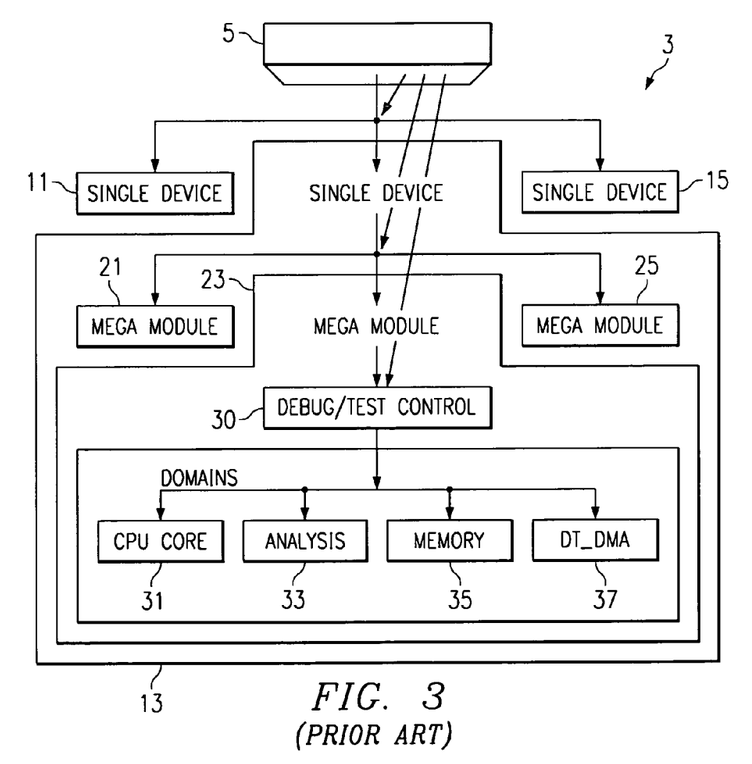
FIG. 3 illustrates an emulation level view of the target system.

FIG. 3 illustrates an emulation level view of target system 3. Target system 3 may include plural devices 11, 13 and 15. FIG. 3 illustrates details of example device 13 which includes plural megamodules 21, 23 and 25. FIG. 3 illustrates details of example megamodule 23. Example megamodule 23 includes debug and test control unit 30 and plural device domains. These device domains include central processing unit (CPU) core 31, analysis unit 33, memory 35 and debug/test direct memory access (DT_DMA) unit 37.

Debug and test control unit 30 contains the IEEE interface. It provides a bridge between the Extended IEEE Interface and the debug and test capability distributed through the domains. Debug and test control unit 30 can independently control by the domains 31, 33, 35 and 37. In other words, one or more domains can be scanned or controlled while other domains continue operate in their normal functional way.

Figure 4:
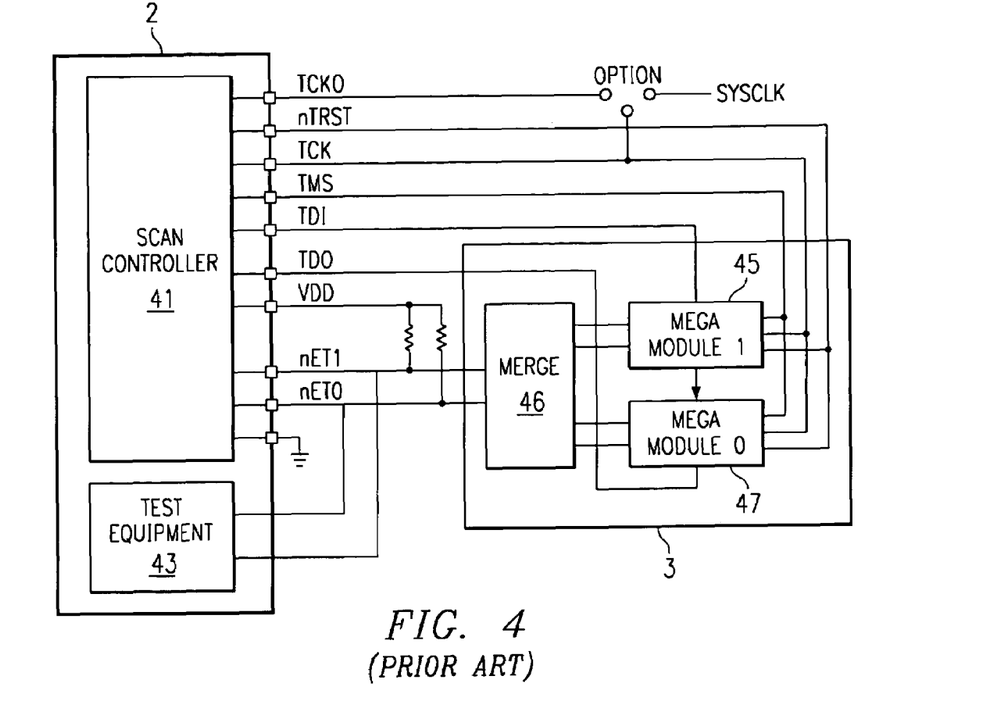
FIG. 4 illustrates an electrical connection view of the coupling between the access adapter and the target system.

FIG. 4 illustrates an electrical connection view of the coupling between access adapter 2 and target system 3. FIG. 4 shows the connections of the various signals of the JTAG header 5 illustrated in FIG. 2. All these signals are connected to scan controller 41. The signals nTRST, TCK and TMS are connected to two example megamodules 45 and 47. FIG. 4 illustrates the optional connection of TCKO to the target system clock SYSCLK. The scan input TDI connects to a scan input of megamodule 45. The scan output of megamodule 45 supplies the scan input of megamodule 47. The scan output of megamodule 47 supplies the scan output TDO. The two extension signals nET0 and nET1 control megamodules 45 and 47 via merge unit 46. These extension signals are monitored by test equipment 43.

The debugging environment illustrated in FIGS. 1 to 4 permit the user to control application execution by any programmable digital processor of target system 3. Typical control processes include: keyboard directives such as run, halt and step; software breakpoints using op-code replacement; internal analysis breakpoints specified program counter or watchpoints specified by data accesses; and externally generated debug events.

Actions such as decoding a software breakpoint instruction (DSTOP), the occurrence of an analysis breakpoint or watchpoint (ASTOP), or the occurrence of a debug host computer event (HSTOP) are referred to as debug events. Debug events cause execution to suspend. Debug events tied to the execution of specific instructions are called breakpoints. Debug events generated by memory references are called watchpoints. External debug events can also suspend execution. Debug events cause entry into the Debug State.

Figure 5:
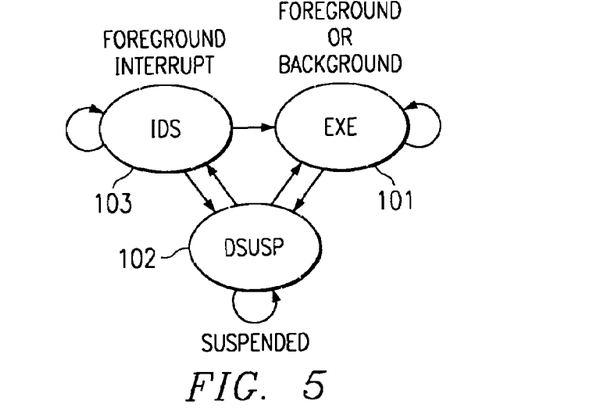
FIG. 5 illustrates the possible operation states in the debugging environment of the preferred embodiment of this invention.

FIG. 5 illustrates the possible operation states in the debugging environment of the preferred embodiment of this invention. These operation states are execute (EXE) 101, debug suspend (DSUSP) 102 and interrupt during debug suspend (IDS) 103.

Execute state 101 corresponds to the ordinary operation of target device 3. In the execute state 101 instructions are executed by the programmable digital processor in normal fashion. There are no outstanding debug suspend conditions. A low logic level applied to the nTRST terminal or a software directive requesting functional run forces the operational state to execute state 101. In execute state 101 the pipeline fetches and executes instructions and processes interrupts in a normal way.

The operational state transits from execute state 101 to debug suspend state 102 upon a debug event. The debugging environment of the preferred embodiment of this invention allows the suspension of program execution at points defined by breakpoint, watchpoints, and debug software directives, provided the application is an allowable debug suspending window. In general, debug events are allowed at an instruction boundary, when reset is inactive and no interrupts are active. Program execution suspends at an instruction boundary and the operational state changes to debug suspend state 102. When any debug condition is not met, the operational state remains in execute state 101 and no debug event processing occurs. The debugging environment permits debug event processing in the delayed slots of delayed branch instructions. Debug events occurring outside the debug suspending window create a debug pending condition. This condition suspends program execution when the application enables debug interrupts by opening the debug suspending window.

In the debug suspend state 102 background instruction execution is inactive. This state permits debug/emulation visibility into the state of target device 3 while background execution is suspended. In debug suspend state 102, the program counter (PC) and status bits are generally preserved at their values prior to the debug event. The PC points to the instruction to be executed next. When execution resumes, the instruction referenced by the PC and those following are fetched for execution. This is facilitated by flushing the front end of the pipeline upon entry into debug suspend state 102 from execute state 101.

The operational state may return to execute state 101 by a debug run directive. This may be either an unconditional run directive or a single step run directive. A single step run directive enters execute state 101 long enough to advance the instruction pipeline one stage and then returns to debug suspend state 102.

It is important to note that debug suspend state 102 consumes no CPU bandwidth because no monitor code executes as a result of suspending execution. The debug architecture provides for complete register and memory accessibility without the aid of a monitor program. The user may change the operating mode at any time without restrictions.

Certain interrupts transit the operation state from debug suspend state 102 to interrupt during suspend (IDS) state 103. These interrupts are defined by a separate interrupt mask independent of the normal interrupt mask. Those interrupts defined as high priority interrupts (HPI) or foreground interrupts cause the operation state to enter the interrupt during suspend state 103 from the debug suspend state 102. The debug suspend state 102 enables high priority interrupts independent of the state of the global interrupt enable bit or of software run directives. This enables debugging of background tasks while the target device 3 continues to service a real time application via high priority interrupts.

The interrupt pipeline jam for such a high priority interrupt moves the operational state to interrupt during suspend state 103. This jam causes an extra word to be pushed on the stack containing the debug status describing the reason the debug suspend state 102 entry occurred. Interrupt during suspend state 103 differs from the execute state 101 in that the interrupt processing creates a thread, linking the interrupt execution to the debug suspend state 102 as described in above. A debug frame counter (DFC) is incremented upon each high priority interrupt taken. The high priority interrupt sets an interrupt during debug state bit (IDS), which is part of the CPU status. The IDS bit sets after the context save stores the previous value on the stack with the status word. When returning from an interrupt the IDS bit indicates whether to re-enter debug suspend state 102. If the IDS bit is set, the interrupt occurred during a debug suspend state 102 and the operational state should return to the debug suspend state 102. If the IDS bit is not set, the interrupt occurred during the execute state 101 and the operational state should return to execute state 101. Upon returning from the interrupt, the PC and status return to their state before the interrupt unless the interrupt service routine has purposely modified values on the stack. This is required because it is possible for multiple interrupts to occur and be serviced while the device is in debug suspend state 102.

The debug frame counter is decremented upon each return from interrupt. This count permits the debug environment to track the status of the suspended foreground task. For example, a taken high priority interrupt may change the machine state and thus the current machine state would not reflect the suspended background task. However, if the debug frame counter were zero, then the debug environment is assured that interrupts have not temporarily changed the machine state.

The interrupt during suspend state 103 is exited at the end of the interrupt service routine. A normal end of an interrupt involves a return from interrupt instruction (RTI). Upon execution of a return from interrupt instruction, the machine status is popped from the stack. As noted above, the interrupt during debug state bit indicates whether the interrupt occurred during execute state 101 or debug suspend state 102. The operational state return to the former state as indicated by the interrupt during debug state bit. The prior value of the program counter is reloaded to recover the prior machine status. Execution of a return from interrupt instruction also decrements the debug frame counter. Because it is possible to receive a higher priority interrupt while servicing a prior interrupt, more than one interrupt level may be pending. The debug frame counter indicates the current interrupt level. This is useful to debug processing as the machine status may be changed by the multiple interrupts. The debug software can read the debug frame counter and supply a debug level identity to identify currently targeted interrupt level. Execution and register operations target a specific debug level. Memory operations can target a specific debug level or bypass the level comparison. In particular, the status of the background task suspended on initial entry into debug suspend state 102 can only be reliably determined if the debug frame counter is zero. The maximum number of levels of the debug frame counter corresponds to the size of the interrupt hierarchy. This data preserves a path back to the debug suspend state 102 when the application concludes the interrupt service routine with a return from interrupt instruction.

The interrupt during suspend state 103 transits to the execute state 102 upon execution of an abort interrupt (ABORTI) instruction. The abort interrupt instruction would ordinarily be used only on detection of an unrecoverable error in the interrupt service routine. The path back to the debug suspend state is broken upon execution of the abort interrupt instruction. The status of the interrupt during debug state bit and the debug frame counter are ignored in this case. In particular, the interrupt during debug state bit is cleared and the debug frame counter is set to zero. This mechanism enables recovery to the background task when a high priority interrupt service routine has an unrecoverable error.

Interrupts can be serviced the while the debug software views or modifies the CPU state. The debug state shown to the programmer reflects the machine state when there is no interrupt service routine active. The debug software works with on-chip debug support to ensure the high priority interrupts are transparent to a debug session. Likewise this hardware and software combination works to make debug activity transparent to high priority interrupt service routines. Note that program execution can actually be suspended in multiple locations if it is desired to break within a time critical interrupt while still allowing others to be serviced.

Figure 6:
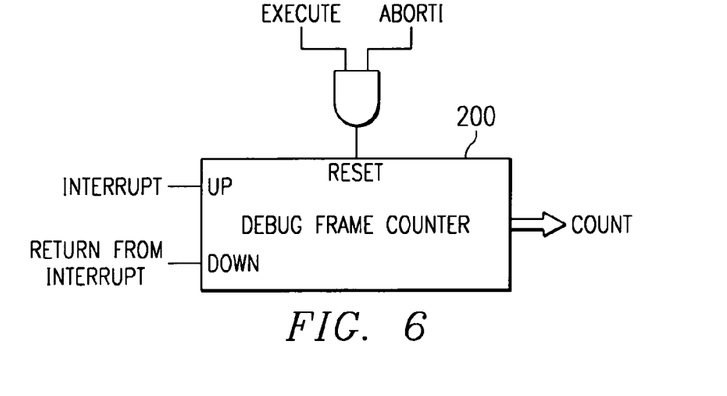
FIG. 6 illustrates the inputs and outputs of the debug frame counter.

FIG. 6 illustrates the inputs and outputs of debug frame counter 200. Debug frame counter 200 is reset to zero by either entry into execute state 101 or occurrence of an ABORTI abort interrupt instruction. Debug frame counter 200 counts up on each taken interrupt. Debug frame counter 200 counts down on each return from interrupt.

Figure 7:
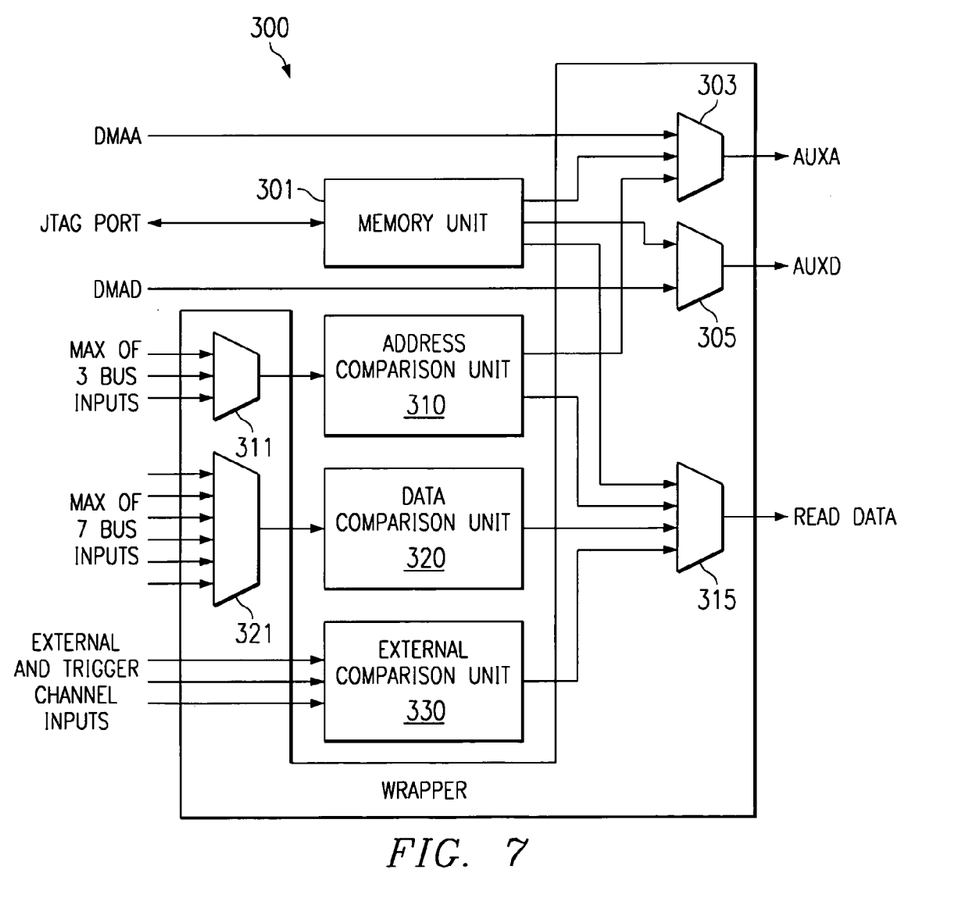
FIG. 7 illustrates in greater detail circuits located on each megamodule concerned with emulation.

FIG. 7 illustrates in greater detail circuits located on each megamodule concerned with emulation. These include address comparison unit (ACU) 310, data comparison unit (DCU) 320 and the external comparison unit 330 (ECU). The address comparison unit 310 provides breakpoint, counter, parallel signature analysis and data logging support. The data comparison unit 320 provides breakpoint and parallel support. The external comparison unit 330 controls external inputs to the event functions. Interaction with the programmable digital processor within the megamodule is handled by the memory unit 301. The application and debug software share access to address comparison unit 310, data comparison unit 320 and external comparison unit 330 by access to their registers.

Memory unit 301 provides the ability to read and write memory. For reads, it sources an address (AUXA) as selected by multiplexer 303 and receives either program read data (PD) or memory read data (MD) as selected by multiplexer 315. For writes it sources an address (AUXA) selected by multiplexer 303 and data (AUXD) selected by multiplexer 305.

Address comparison unit 310 contains two 32 bit registers AREF and AMSK and one 16 bit register ACNTL. The AREF and AMSK registers are preferably 32 bit data registers that can be addressed as sixteen bit registers in 16 bit architectures. Their function is defined by the ACNTL register described in Table 2. The ACNTL register configures the AREF and AMSK registers in a number of modes, including: DMA reads and writes for data logging, downloads and uploads; event generation such as breakpoints, watchpoints and nET0 and nET1 triggers; counts for benchmarking, watchdog timing and period counters; parallel signature analysis functions for test; off performing no function and ownership by the application or debug is unchanged; and unclaimed performing no function and either the application or debug can obtain ownership. Address comparison unit 310 is responsive to the bus input selected by multiplexer 311.

The address comparison unit 310 configures for event generation where the AMSK register serves as an address mask register and the AREF register serves as an address reference. The address comparison unit 310 generates a debug suspend request. The AMSK field defines the address comparison unit 310 debug suspend request rudeness level. The ability to generate an event without generating a debug suspend request allows the address comparison unit 310 event to be used as a trigger generator through the ETx pins without altering core execution. This function supports breakpoints, watchpoints, and trigger generation. Table 2 shows the function specific bit mode bit definition of register ACNTL for event generation.

TABLE 2

| Function | Bit(s) | Description |
| --- | --- | --- |
| ASELA[1:0] | 08:07 | Select Address - Select address for event comparison<br>00 - Select no address<br>01 - Select program address<br>10 - Select memory address<br>11 - Reserved |
| AMSKON | 06 | Mask On - Logically OR the AMSK register contents with the address selection |
| AREVT | 05 | Read Event - Generate event on read cycles (watchpoint) |
| AWEVT | 04 | Write Event - Generate event on write cycles (watchpoint) |
| AIEVT | 03 | Instruction Event - Generate event on instruction cycles, break only if instruction executes (breakpoint) |
| AEXTQ | 02 | External Qualifier - When a one, the external qualifier input qualifies ACU event generation at the point the address comparison is made. |
| AJOIN | 01 | Join - The event for the ACU is qualified by the DCU event output. Both the ACU and DCU comparisons must be TRUE to declare an ACU event. For cases where an ACU address comparison is joined to a DCU data comparison, the ACU comparison is delayed to align in time with the DCU data comparison. |

Specific alignment of address, data, and cycle qualifiers is architecture specific to the particular programmable digital processor. Breakpoint events are processed if and only if the instruction referenced by the breakpoint tag reaches the point in the instruction decode where the instruction would execute had the break event not been generated.

The address comparison unit 310 configures for counter functions where the AMSK register serves as a counter and the AREF register either configures an eight bit counter that extends the reach of the AREF counter or serves as compare value that identifies the reload point for the AMSK counter. The counter configurations are a 40 bit benchmarking counter, a 32 bit period counter (reloadable when count reaches zero), or two sixteen bit reloadable counters. These counter functions support benchmarking, watchdog, period, and external event counting in addition to supporting execution pauses in anticipation of externally generated debug suspend requests. Table 3 shows the function specific bit mode bit definition of register ACNTL for counter functions.

TABLE 3

| Function | Bit(s) | Description |
| --- | --- | --- |
| ACM[1:0] | 08:07 | Count Mode<br>00 -Pause Period (8 bits)/Period (24 bits)<br>01 -Period (2-16 bit)<br>10 -Period (32 bits)<br>11 -Benchmark (40 bits) |
| ACEN1[1:0] | 06:05 | Count Enable<br>00 -Continuous count<br>01 -Count when DCU event output is TRUE, else no count<br>10 -Count when nET0 is TRUE, else no count<br>11 -Count when nET1 is TRUE, else no count |
| ACEN0[1:0] | 04:03 | Count Enable<br>00 -Continuous count<br>01 -Count when DCU event output is TRUE, else no count<br>10 -Count when the nET0 is TRUE, else no count<br>11 -Count when the nET1 is TRUE, else no count |
| ARL[1:0] | 02:01 | Count Reload<br>00 - No reload, roll over at zero<br>01 - Reload at zero and count<br>10 - No reload, generate debug suspend at zero, stay at zero<br>11 - Wait at zero for external start, Count up to reload, reload to zero, wait for external start<br>Reload occurs when the count value equals the reference value and a count condition occurs. |
| AFREE | 00 | Free<br>0 -count free of the CPU execution state<br>1 -if debug enable bit is FALSE, count<br>if debug enable bit is TRUE, don't count |

The address comparison unit 310 configures for parallel signature analysis functions where the AMSK and AREF registers serve a parallel analysis generator. Either the program address or memory address can be configured as the parallel signature analysis input. The parallel signature analysis calculation begins when the parallel signature analysis function is enabled and terminates when the address comparison unit 310 function is specified as OFF or the function is changed. Table 4 shows the function specific bit definition of register ACNTL for counter functions.

TABLE 4

| Function | Bit(s) | Description |
| --- | --- | --- |
| ASELA[1:0] | 08:07 | Select Address - Select address for event comparison<br>00 - Select no address<br>01 - Select program address<br>10 - Select memory address<br>11 - Reserved |
| Reserved | 06 | Reserved |
| Don't Care | 05:00 | These bits are a don't care for the parallel signature analysis function |

The address comparison unit 310 configures to an off mode where either the debug software or application retains ownership but the address comparison unit 310 block is off. In this off configuration, the current owner retains ownership. For the unclaimed mode, neither the debug software or application retains ownership and the address comparison unit 310 block is off.

The data comparison unit 320 contains two 32 bit registers DREF and DMSK and one 16 bit register DCNTL. The DREF and DMSK registers are merely 32 bit data registers that can be addressed as sixteen bit registers in 16 bit architectures. Their function is defined by the DCNTL register described in Table 5. This DCNTL register configures the DREF and DMSK registers in a number of modes, including: event generation such as breakpoints, watchpoints and nET0 and nET1 triggers; parallel signature analysis functions for test; reloadable period counts; off performing no function and ownership by the application or debug is unchanged; and unclaimed performing no function and either the application or debug can obtain ownership. Data comparison unit 320 is responsive to the bus input selected by multiplexer 321.

The data comparison unit 320 configures for event generation where the DMSK register serves as a mask register and the DREF register serves as a comparison reference. The data comparison unit 320 generates a debug suspend request. The DMSK field defines the data comparison unit 320 debug suspend request rudeness level. Generation of an event without generating a debug suspend request allows the data comparison unit 320 event to be used as a trigger generator through the nET0 and nET1 pins without altering core execution. This function supports break and watchpoints, execution pause, and event counting.

The data comparison unit 320 event generation works in tandem with the address comparison unit 310 event generation to provide address and data breakpoints. This feature requires that the two units be joined. The address comparison unit 310 event detects the address match while the data comparison unit 320 detects the read data or write data match associated with an access. The address comparison unit 310 address comparison is delayed to align with the data comparison unit 320 event processing.

The data comparison unit 320 provides a unique ability to compare up to 32 user supplied inputs to a reference. The user inputs supplied to the megamodule core can be parallel signature analyzed or used as events. The selection of the data comparison unit 320 parallel signature analysis mode is made available to the logic outside the CPU megamodule. Table 5 shows the function specific bit mode bit definition for data comparison unit 320 event generation.

TABLE 5

| Function | Bit(s) | Description |
|---|---|---|
| DMSK[1:0] | 10:09 | Debug suspend Request Mask - Generate one of four debug suspend requests provided the DSTOP field specifies a debug suspend request. 00 -debug enable bit and not high priority interrupt 01 -not high priority interrupt 10 -debug enable bit 11 -any, debug enable bit and high priority interrupt are don't cares |
| DSEL[2:0] | 08:06 | Select Comparison Input - Select program address for event comparison 000 - Program Address 001 - Memory Address 010 - Program Read Data 011 - Memory Read Data 100 - Program Write Data 101 - Memory Write Data |

TABLE 5-continued

| Function | Bit(s) | Description |
|---|---|---|
| | | 110 - External parallel signature analysis inputs 111 - Reserved, no selection |
| DREVT | 05 | Read Event - Generate event on read cycles (watchpoint) |
| DWEVT | 04 | Write Event - Generate event on write cycles (watchpoint) |
| DIEVT | 03 | Instruction Event - Generate event on instruction cycles, break only if instruction is executes (breakpoint) |
| DEXTQ | 02 | External Qualifier - When a one, the external qualifier input qualifies DCU event generation at the time of the comparison. |
| DJOIN | 01 | Join - The event for the DCU is qualified by the ACU pre event output, both must be true to declare event |
| DSTOP | 00 | Debug suspend 0 - qualify the event generation but generate no debug suspend action 1 - generate a debug suspend request defined by DMSK[1:0] |

The data comparison unit 320 counter function, when implemented, are identical to those for the address comparison unit 310. Please refer to Table 3 for a description of counter modes. The input from the address comparison unit 310 is named DAEVT instead of ADEVT.

The data comparison unit 320 configures for a parallel signature analysis functions where the DMSK and DREF registers serve a parallel signature analysis generator. The data comparison unit 320 parallel signature analysis function provides for the selection of any of the six sources shown in Table 6 as the parallel signature analysis input. The parallel signature analysis calculation begins when the parallel signature analysis function is enabled and terminates when the data comparison unit 320 function is specified as OFF. Changing the function to another function has undetermined results. Table 6 shows the function specific bit mode bit definition for parallel signature analysis functions.

TABLE 6

| Function | Bit(s) | Description |
|---|---|---|
| Don't Care | 10:09 | These bits are a don't care for the parallel signature analysis function. |
| DSEL[2:0] | 08:06 | Select Comparison Input - Select program address for event comparison 000 - Program Address 001 - Memory Address 010 - Program Read Data 011 - Memory Read Data 100 - Program Write Data 101 - Memory Write Data 110 - External parallel signature analysis inputs 111 - Reserved, no selection |
| Don't Care | 05:00 | These bits are a don't care for the parallel signature analysis function |

The data comparison unit 320 configures in off and unclaimed modes identical to that of the address comparison unit 310.

The external comparison unit 330 includes a register ECNTL that manages external events that can generate debug suspend requests. The ECNTL register manages emulation and test pin zero and one inputs as well as external input used by the logic for external hardware triggering. Refer to Table 7 for a description of this function.

TABLE 7

| Function | Bit(s) | Description |
|---|---|---|
| EDBGO | 15 | External Debug Ownership<br>0 - if any of bits 14-11 are 1, the application owns<br>1 - if any of bits 14-11 are 1, debug owns<br>If neither of these two conditions are true, the function is unclaimed |
| EFEN | 14 | External Function Enable<br>0 - external event function is disabled this function cannot generate debug suspend events<br>1 - external event function is enabled and function can generate debug suspend events |
| ET1EN | 13 | ET1 Input Enable<br>0 - nET1 ignored<br>1 - if EFEN is 1, synchronized nET1 input can generate debug suspend |
| ET0EN | 12 | ET0 Input Enable<br>0 - nET0 ignored<br>1 - if EFEN is 1, synchronized nET0 input can generate debug suspend |
| EXTEN | 11 | External Input Enable<br>0 - external event ignored<br>1 - if EFEN is 1, synchronized external event can generate debug suspend |
| EMSK[1:0] | 10:09 | Debug suspend Request Mask - Generate one of four debug suspend requests provided EFEN true<br>00 - debug enable bit and not high priority interrupt<br>01 - not high priority interrupt<br>10 - debug enable bit<br>11 - any, debug enable bit and high priority interrupt are don't cares |

The application and debug software share registers controlling external trigger event inputs, breakpoints and watchpoints, data logging, parallel signature analysis, and count functions. The application and debug software can not simultaneously own these resources but establish ownership and release ownership through memory mapped control registers continuously visible to both the application and debug software. The debug software has the ability to seize any resource if necessary, or negotiate with the application through software sequences.

Each emulation peripheral including address comparison unit 310, data comparison unit 320 and external comparison unit 330 includes a further function to aid in debugging. Upon triggering a debug suspend state, each emulation peripheral stores the current state of the debug frame counter. For initial entry into debug suspend state 102, the debug frame count will be zero. However, in debug suspend state 102 foreground interrupts may be serviced by transiting to interrupt during suspend state 103. It is possible that while performing the corresponding interrupt service routine that another debug event could occur. This would trigger a return to the debug suspend state 102. Recall that the debug frame count increments upon each debug event and decrements upon each completed interrupt service routine exited via a return from interrupt instruction. By storing the current status of the debug frame counter in a debug frame register, later debug software can sort out the interrupt path in any particular instance.

It is desirable to limit each emulation peripheral to a single debug event before being cleared. If an emulation peripheral has already triggered a debug event and holds a non-zero debug frame count in its debug frame register, this it is not permitted to generate another debug event. This limitation restricts the complexity of the debug event unrolling, generally permitting an easy determination of the instruction path in any particular instance.

What is claimed is:

1. A method of in circuit emulation of an integrated circuit including a digital data processor capable of executing program instructions, comprising the steps of:
   detecting a first debug event during normal program execution;
   upon detection of the first debug event suspending normal program execution while permitting at least one type interrupt service routine executed in response to a corresponding interrupt;
   incrementing a debug frame counter upon each of the at least one type interrupt received while suspending normal program execution;
   decrementing the debug frame counter upon each return from interrupt received while suspending normal program execution;
   detecting at least one second debug event during an interrupt service routine executing while suspending normal program execution;
   upon detection of the second debug event suspending program execution of the interrupt service routine while permitting execution of other interrupt service routines in response to corresponding interrupts; and
   storing the count of said debug frame counter upon each second debug event.

2. The method of claim 1, wherein said integrated circuit includes a plurality of debug event detectors, and wherein:
   said step of detecting a first debug event occurs at a first one of the plurality of debug event detectors;
   said step of detecting a second debug event occurs at a second one of the plurality of debug event detectors; and
   said step of storing the count of said debug frame counter occurs at said second one of the plurality of debug event detectors.

3. The method of claim 2, further comprising:
   determining an order of interrupts triggering second debug events by reading said stored count of said debug frame counter from each of said debug event detectors.

4. The method of claim 2, wherein said integrated circuit includes a plurality of emulation peripherals, each emulation peripheral including a plurality of debug event detectors and further comprising:
   limiting each of said emulation peripherals to triggering a single debug event before being cleared.

5. The method of claim 4, wherein:
   said limiting step includes
   upon detecting a debug event at each debug event detector checking the stored count of the debug frame counter, and
   prohibiting triggering a debug event if the stored count of the debug frame counter is nonzero.

6. The method of claim 1, further comprising:
   resetting the debug frame counter upon return to normal program execution.

7. The method of claim 1, further comprising:
   resetting the debug frame counter upon an abort interrupt corresponding to an unrecoverable error during an interrupt service routine.

* * * * *